(12) United States Patent
Zhou

(10) Patent No.: US 8,570,751 B2
(45) Date of Patent: Oct. 29, 2013

(54) MOUNTING APPARATUS FOR REMOVABLE MODULE

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/447,300

(22) Filed: Apr. 16, 2012

(65) Prior Publication Data
US 2013/0168337 A1 Jul. 4, 2013

(30) Foreign Application Priority Data
Dec. 28, 2011 (CN) .......................... 2011 1 0447343

(51) Int. Cl.
*H05K 7/16* (2006.01)
(52) U.S. Cl.
USPC ............................ 361/726; 361/725; 361/724
(58) Field of Classification Search
USPC .......... 248/27.1, 27.3; 292/80, 81, 83, 87, 88, 292/89, 300, 303, 304; 312/333, 319.2, 312/223.2; 361/679.37–39, 679.4, 679.41, 361/679.43, 679.44, 725–727
See application file for complete search history.

(56) References Cited

U.S. PATENT DOCUMENTS

| | | | | |
|---|---|---|---|---|
| 1,241,192 A | * | 9/1917 | Bruder | 292/83 |
| 5,779,197 A | * | 7/1998 | Kim | 248/27.1 |
| 6,373,695 B1 | * | 4/2002 | Cheng | 361/679.39 |
| 6,413,122 B2 | * | 7/2002 | Fujioka | 439/680 |
| 6,651,936 B2 | * | 11/2003 | Upson et al. | 248/27.3 |
| 6,921,282 B2 | * | 7/2005 | Chiou et al. | 439/483 |
| 7,085,131 B2 | * | 8/2006 | Peng et al. | 361/679.32 |
| 7,234,241 B2 | * | 6/2007 | Chu | 30/160 |
| 7,604,308 B2 | * | 10/2009 | Tseng et al. | 312/333 |
| 7,823,934 B2 | * | 11/2010 | Huang et al. | 292/143 |
| 2005/0190535 A1 | * | 9/2005 | Peng et al. | 361/685 |
| 2006/0139864 A1 | * | 6/2006 | Chen et al. | 361/683 |
| 2008/0013287 A1 | * | 1/2008 | Karstens | 361/726 |

* cited by examiner

*Primary Examiner* — Jonathan Liu
*Assistant Examiner* — James Twomey
(74) *Attorney, Agent, or Firm* — Altis & Wispro Law Group, Inc.

(57) ABSTRACT

A mounting apparatus for mounting a removable module in a chassis with a sidewall defining a locking slot includes a locking member, and an operation member. The removable module includes a side plate defining a through slot, and an end plate defining a through hole adjacent to the end plate. The operation member is pivotably attached to an inner surface of the side plate. The locking member includes a mounting piece fixed to the inner surface of the side plate, and a resilient piece slantingly extending from the mounting piece. A wedge extends from the resilient piece. The operation member includes a handle and a pressing portion. The handle is operated to rotate the operation member in to make the pressing portion press the resilient piece toward the side plate, until the wedge extends through the through slot to lock in the locking slot of the sidewall.

12 Claims, 3 Drawing Sheets

MOUNTING APPARATUS FOR REMOVABLE MODULE

CROSS-REFERENCE TO RELATED APPLICATIONS

Relevant subject matter is disclosed in a pending U.S. patent application, with application Ser. No. 13/442,877, filed on Apr. 10, 2012, and entitled "MOUNTING APPARATUS FOR REMOVABLE MODULE, which is assigned to the same assignee with this patent application.

BACKGROUND

1. Technical Field

The present disclosure relates to mounting apparatuses and, more particularly, to an apparatus for mounting a removable module in a chassis.

2. Description of Related Art

Many electronic devices, such as computers and servers, include a plurality of removable modules, such as data storage modules and power supply modules, mounted in chassis of the electronic devices. The traditional structure of the chassis cannot satisfy the requirement to assemble or disassemble the removable module rapidly.

BRIEF DESCRIPTION OF THE DRAWINGS

Many aspects of the present embodiments can be better understood with reference to the following drawing. The components in the drawing are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
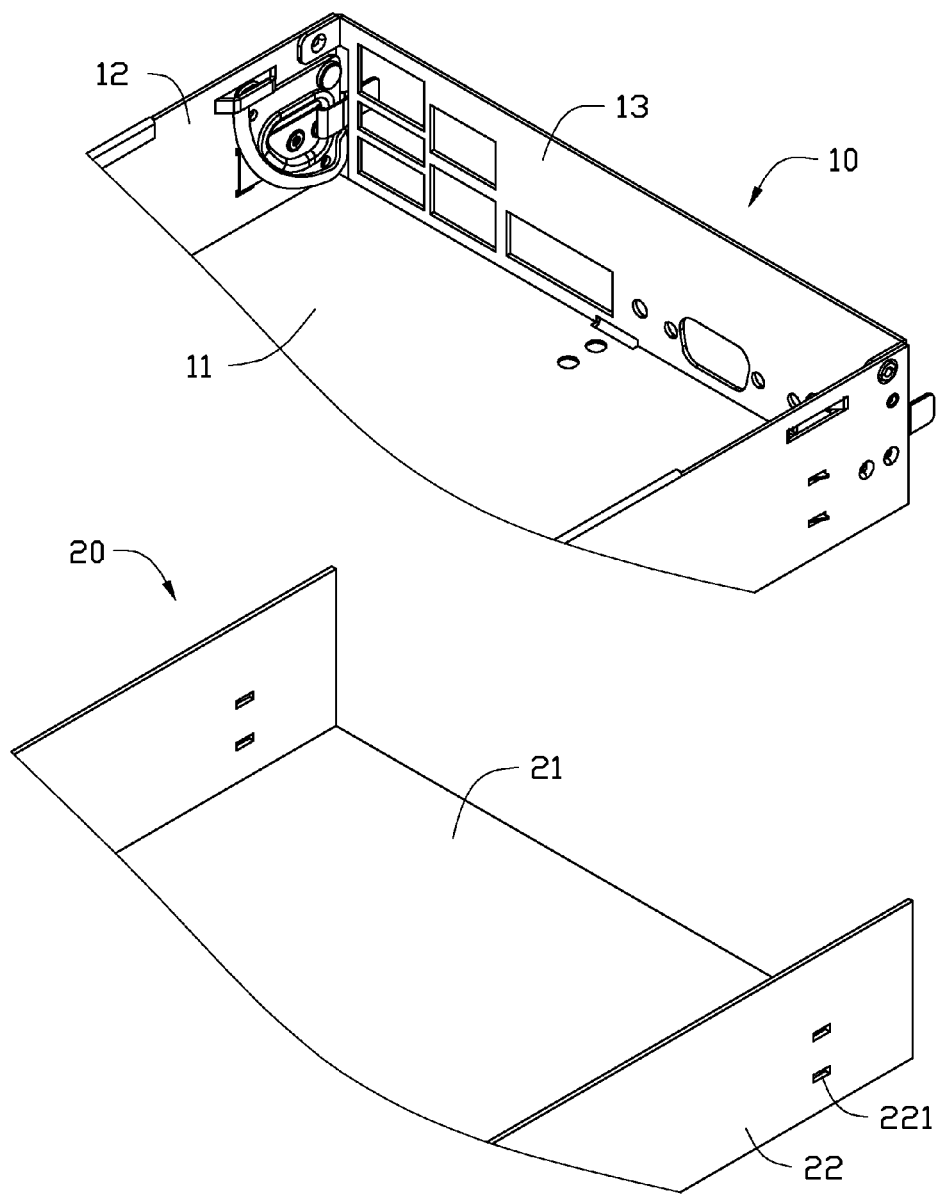
FIG. 1 is an isometric view showing a removable module separated from a chassis.
Figure 2:
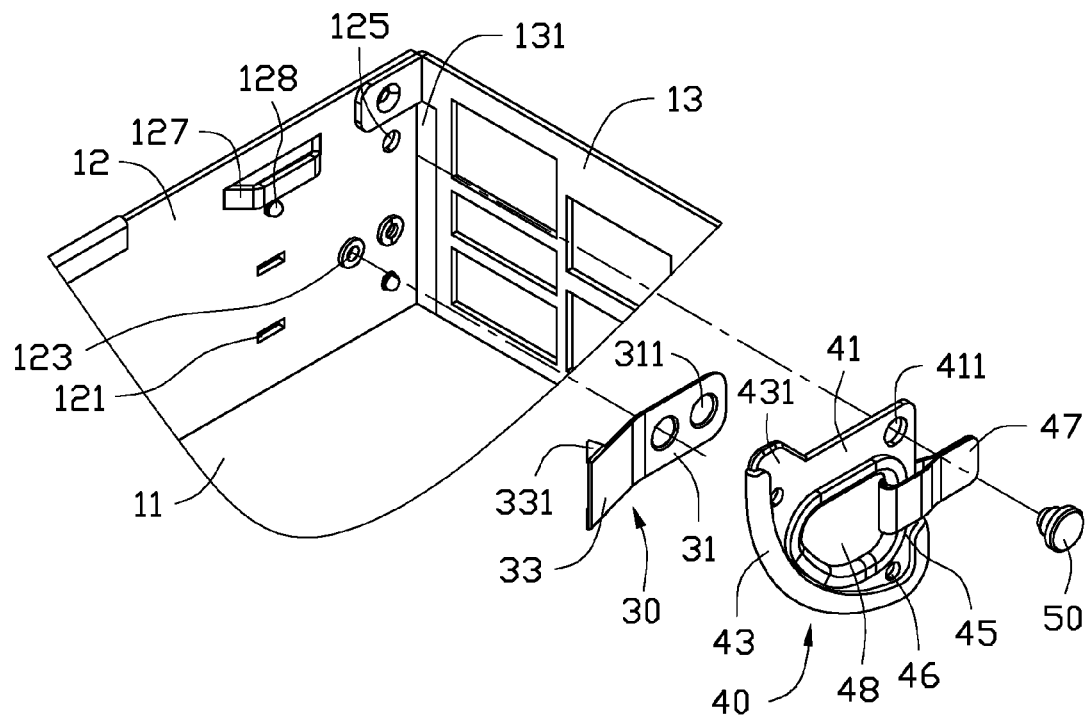
FIG. 2 is an exploded, isometric view of the removable module of FIG. 1.
Figure 3:
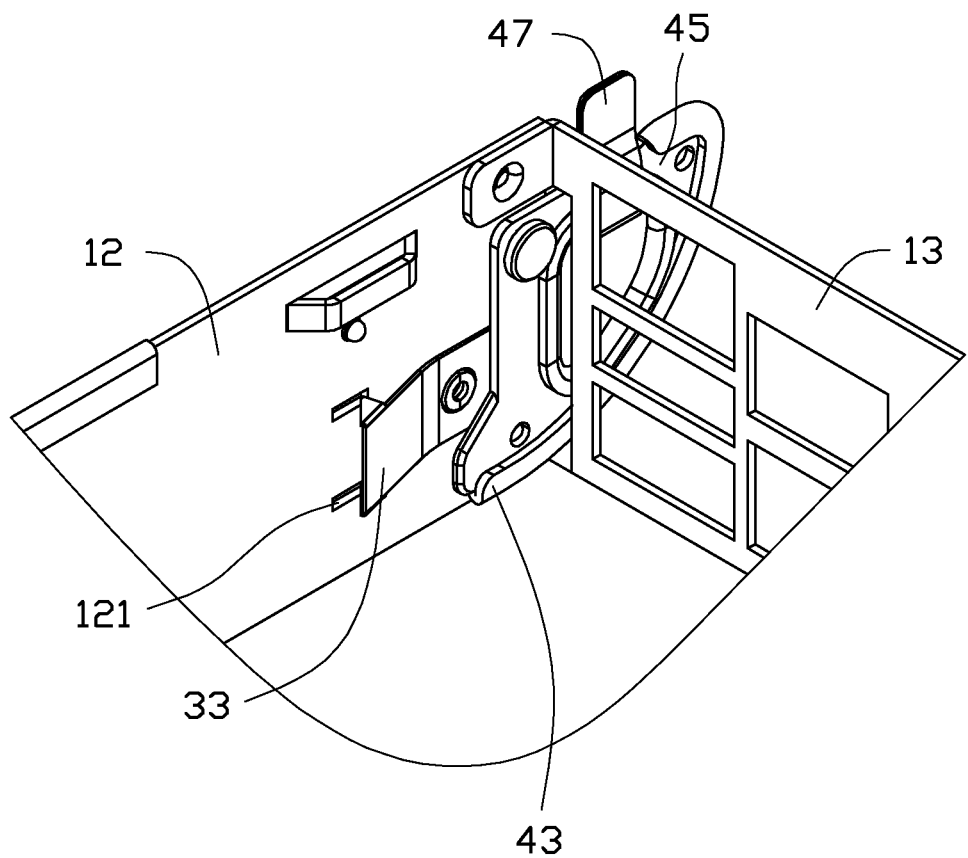
FIG. 3 is an assembled view of FIG. 2, showing a state of use.

FIG. 1 to FIG. 3, show an embodiment of a mounting apparatus provided to mount a removable module 10, such as a server module or a data storage module, in a chassis 20. The mounting apparatus includes a locking member 30 and an operation member 40.

The chassis 20 includes a bottom wall 21 and two sidewalls 22 perpendicularly extending from opposite sides of the bottom wall 21. Each sidewall 22 defines two parallel locking slots 221.

The removable module 10 includes a bottom plate 11, with two side plates 12 perpendicularly extending from opposite sides of the bottom plate 11. In addition, an end plate 13 perpendicularly extending from one end of the bottom plate 11 and connected between the side plates 12. A through slot 131 is defined in the end plate 13, adjacent to one of the side plates 12. Each side plate 12 defines two parallel through slots 121. Two mounting pins 123 protrude in from an inner side of each side plate 12, near the end plate 13. A mounting hole 125 is defined in each side plate 12, above the mounting pins 123. A raised bridge 127 is formed on the inner side of each side plate 12, above the through slots 121. Two positioning portions 128 protrude from the inner side of each side plate 12, around the mounting hole 125. A distance from the mounting hole 125 to one of the positioning portions 128 is equal to a distance from the mounting hole 125 to the other positioning portion 128.

The locking member 30 is a resilient sheet, and includes a mounting piece 31 and a resilient piece 33 slantingly extending from one end of the mounting piece 31. Two wedges 331 protrude from a distal end of the resilient piece 33 opposite to the mounting piece 31. The mounting piece 31 defines two mounting holes 311.

The operation member 40 is a plate, and includes a substantially fan-shaped main body 41, a handle 45 formed on a first side of the main body 41 around an opening 48 defined in a center of the main body 41. In addition, a pressing portion 43 is formed from a circumference of the main body 41, and a protrusion 431 is extending out from a second side of the main body 41 and adjacent to an end of the pressing portion 43. A pivot hole 411 is defined in a center of a circle of the main body 41. Two positioning holes 46 are defined in the main body 41, near the corresponding first and second side respectively. A distance from the pivot hole 411 to one of the positioning holes 46 is equal to a distance from the pivot hole 411 to the other positioning hole 46. A flexible tape 47 is attached to the handle 45.

In assembly, the locking member 30 is fixed to the inner side of the side plate 12 through the mounting pins 123 engaging in the corresponding mounting holes 311. The resilient piece 33 slantingly extends away from the side plate 12. The wedges 331 face and align with the corresponding through slots 121. A fastener 50 extends through the pivot hole 411 to screw into the mounting hole 125, to pivotably mount the operation member 40 to the inner side of the side plate 12. The locking member 30 is sandwiched between the side plate 12 and the operation member 40. The handle 45 can be exposed out of or drawn back into the removable module 10 through the through slot 131. The fastener 50 may be a rivet or a screw.

When assembling the removable module 10 in the chassis 20, the removable module 10 is pushed into the chassis 20 until the through slots 121 align with the corresponding locking slots 221. The handle 45 is manipulated to rotate the operation member 40. The pressing portion 43 presses the resilient piece 33 to be deformed toward the side plate 12, until the wedges 331 extends through the corresponding through slots 121 to engage in the corresponding locking slots 221. Therefore, the removable module 10 is locked in the chassis 20. The positioning portions 128 engage in the corresponding positioning holes 46, to position the operation member 40. The protrusion 431 extends through and engages in the bridge 127 to fix the operation member 40.

When releasing the removable module 10 from the chassis 20, the operation member 40 is rotated out until the pressing portion 43 is removed from the resilient piece 33. The resilient piece 33 is restored to make the wedges 331 release from the corresponding locking slots 221. Therefore, the removable module 10 is easily pulled out from the chassis 20. The positioning portion 128 near the through slot 131 engages in the positioning hole 46 near the protrusion 431, to position the operation member 40.

In this embodiment, the handle 45 can withdraw back into the removable module 10 through the through hole 131, to avoid interference with other elements. When it is needed to operate the operation member 40, the tape 47 can be manipulated to pull out the handle 45 first, the handle 45 is then operated to move the operation member 40 further.

The two side plates 12 each can be equipped with a mounting apparatus of the embodiment, to more firmly mount the removable module 10.

Even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. An assembly comprising:
    a chassis comprising a sidewall defining a locking slot;
    a removable module comprising a side plate and an end plate perpendicularly connected to the side plate, the side plate defining a through slot, the end plate defining a through hole adjacent to the side plate
    a mounting apparatus for mounting the removable module in the chassis, the mounting apparatus comprising
    a locking member comprising a mounting piece mounted to an inner side of the side plate near the end plate and a resilient piece extending slantingly from one end of the mounting piece away from the side plate, the resilient piece comprising a wedge formed on one end of the resilient piece away from the mounting piece and facing the through slot; and
    an operation member pivotably mounted to the inner side of the side plate, the operation member comprising a pressing portion, and a handle extendable through the through hole of the end plate, wherein the handle is manipulated to pivot the operation member around an axis perpendicular to the side plate such that the pressing portion presses the resilient piece to be deformed toward the side plate along a direction perpendicular to the side plate until the wedge extends through the through slot to engage in the locking slot.

2. The mounting apparatus of claim 1, wherein the operation member comprises a substantially fan-shaped main body, a pivot hole is defined in a center of a circle of the main body, a fastener extends through the pivot hole to screw into the side plate, to pivotably mount the operation member to the side plate.

3. The mounting apparatus of claim 2, wherein the handle is formed on a first side surface of the main body around an opening defined in a center of the main body, the pressing portion is formed from a circumference of the main body.

4. The mounting apparatus of claim 3, wherein a protrusion extends out from a second side of the main body adjacent to an end of the pressing portion, a raised bridge is formed from the inner side of the side plate, above the through slot, the protrusion is engageable in the bridge to fix the operation member.

5. The mounting apparatus of claim 2, wherein two positioning holes are defined in the main body near the corresponding first and second sides, a distance between the pivot hole and one of the positioning holes is equal to a distance between the pivot hole and the other positioning hole, two positioning portions protrude from the inner side of the side plate, the positioning portions engage in the corresponding positioning holes, to position the operation member.

6. The mounting apparatus of claim 1, wherein a flexible tape is attached to the handle.

7. An assembly, comprising:
    a chassis comprising a sidewall defining a locking slot;
    a removable module comprising a side plate and an end plate perpendicularly connected to the side plate, the side plate defining a through slot, the end plate defining a through hole adjacent to the side plate;
    a locking member comprising a mounting piece mounted to an inner side of the side plate near the end plate and a resilient piece extending slantingly from one end of the mounting piece away from the side plate, the resilient piece comprising a wedge formed from one end of the resilient piece away from the mounting piece and facing the through slot; and
    an operation member pivotably mounted to the inner side of the side plate, and sandwiching the locking member together with the side plate, the operation member comprising a pressing portion, and a handle extendable through the through hole of the end plate, wherein the handle is manipulated to move the operation member such that the pressing portion presses the resilient piece to be deformed toward the side plate until the wedge extends through the through slot to engage in the locking slot.

8. The assembly of claim 7, wherein the operation member comprises a substantially fan-shaped main body, a pivot hole is defined in a center of a circle of the main body, a fastener extends through the pivot hole to screw into the side plate, to pivotably mount the operation member to the side plate.

9. The assembly of claim 8, wherein the handle is formed on a first side of the main body around an opening defined in a center of the main body, the pressing portion is formed from a circumference of the main body.

10. The assembly of claim 9, wherein a protrusion extends out from a second side of the main body adjacent to an end of the pressing portion, a raised bridge is formed from the inner side of the side plate, above the through slot, the protrusion is engageable in the bridge to fix the operation member.

11. The assembly of claim 8, wherein two positioning holes are defined in the main body near the corresponding first and second sides, a distance between the pivot hole and one of the positioning holes is equal to a distance between the pivot hole and the other positioning hole, two positioning portions protrude from the inner side of the side plate, the positioning portions engage in the corresponding positioning holes, to position the operation member.

12. The assembly of claim 7, wherein a flexible tape is attached to the handle.

* * * * *